United States Patent [19]

Hughes

[11] 4,190,327
[45] Feb. 26, 1980

[54] DEFORMABLE LIQUID MIRROR

[75] Inventor: Richard S. Hughes, Ridgecrest, Calif.

[73] Assignee: The United States of America as represented by the Secretary of the Navy, Washington, D.C.

[21] Appl. No.: 951,533

[22] Filed: Oct. 16, 1978

[51] Int. Cl.² ............................................. G02B 5/10
[52] U.S. Cl. .................................. 350/310; 350/295; 331/94.5 T
[58] Field of Search ...................... 350/179, 295, 310; 331/94.5 D, 94.5 T

[56] References Cited

U.S. PATENT DOCUMENTS

| 504,890 | 9/1893 | Ohmart | 350/179 UX |
|---|---|---|---|
| 3,371,287 | 2/1968 | Haddad | 331/94.5 |
| 3,582,190 | 6/1971 | Smith | 350/310 |
| 3,628,178 | 12/1971 | Treacy | 331/94.5 |
| 3,836,236 | 9/1974 | Kirk et al. | 350/310 |
| 3,909,118 | 9/1975 | Schmidt | 350/310 |
| 3,932,029 | 1/1976 | Weiss | 350/310 |
| 3,942,880 | 3/1976 | Zeiders, Jr. | 350/310 |

OTHER PUBLICATIONS

Perry, *Applied Optics*, vol. 4, No. 8, Aug. 1965, pp. 987–991.
Spiller, *Applied Optics*, vol. 15, No. 10, Oct. 1976, pp. 2333–2338.
Berthold, *Applied Optics*, vol. 8, No. 9, Sep. 1969, pp. 1919–1924.

*Primary Examiner*—F. L. Evans
*Attorney, Agent, or Firm*—R. S. Sciascia; W. Thom Skeer; K. G. Pritchard

[57] ABSTRACT

A liquid mirror for high energy lasers. A working liquid such as mercury, is used as the reflecting surface for laser light. Dielectric enhanced reflecting techniques can be used to increase significantly the amount of reflection from the working liquid. The liquid is contained in a pressure cell behind a transparent optical flat. By varying the pressure cell of the liquid, compensation for the aberration caused by heat absorption can be made. These same pressure changes can be used to correct for laser beam wavefront distortions produced elsewhere in the laser, director or atmosphere.

9 Claims, 4 Drawing Figures

DEFORMABLE LIQUID MIRROR

BACKGROUND OF THE INVENTION

1. Field of the Invention

This invention pertains to laser mirrors and to high energy laser mirrors in particular. In even finer detail, it relates to liquid mirrors suitable for high energy lasers.

2. Description of Prior Art

Lasers are common light sources in the present world. The growth of laser uses has increased the interest in high energy lasers. One of the limiting factors in the development of high energy lasers, such as $CO_2$ lasers, has been surface damage and/or deformation of laser mirrors.

Numerous attempts have been made in the prior art to provide cooling of the mirror surface to avoid the heat buildups which damages and/or deforms the surface. Recent attempts to solve this problem include U.S. Pat. Nos. 3,942,880 to Zeiders, 3,932,029 to Weiss and 3,909,118 to Schmidt. These patents rely on a coolant pumped along the back surface of the mirror to absorb heat. The heat transfer flow in such device is not able to prevent heat buildup which produces thermal induced distortions. These devices are also limited by surface damage, e.g., melting or pitting due to hot spots on the mirror surface caused by the mirror's inability to dissipate the energy absorbed from the laser beam.

U.S. Pat. No. 3,371,287 to Haddad uses a liquid reflecting surface. The Haddad patent permits continuous replacement of a surface that is damaged by heating effects. Even the Haddad patent is limited when used in modern high energy lasers. Current lasers produce such high power that Haddad's invention is subject to catastrophic failure due to the low reflectivity of the mirror and the heat buildup of the system as a whole. Static heat buildup in the Haddad mirror causes thermal distortions due to expansion of the various components.

The use of dielectric layers to enhance reflection has been described in "Low-Loss Multilayer Dielectric Mirrors" by D. L. Perry, Applied Optics, Vol. 4, #8, 1965 and in "Computer Design and Fabrication Techniques for a Wideband Dielectric Mirror", by J. Berthold in Applied Optics, Vol. 8, #9, 1969. Further background can be found in "Monographs on Applied Optics No. 4, Metal-Dielectric Multilayers" by John Macdonald, American Elsevier Pub. Co., 1971, and "Optical Properties of Dielectric Films" edited by Norman Axelrod, The Electrochemical Society, 1968.

SUMMARY OF THE INVENTION

The present invention creates a deformable mirror by regulating the pressure of a reflecting liquid. A liquid, such as mercury, flows through a pressure cell containing an optical flat plate which serves as a window for light. The liquid is temperature controlled by its flow through a heat exchanger. The optical flat is flexible and will form a concave or convex surface depending on the pressure of the liquid it contains. In addition, glass optical flats can be polished to form smoother surfaces than metals. Liquid metals conform to the glass surface they are against thus acquiring surfaces as smooth as the glass optical flat.

A preprogrammed microprocessor controls a pressure regulator to provide for the degree of corrective mirror deformation required as a function of metal or optical flat temperature. The same microprocessor can be used to monitor external cavity conditions which can be compensated for by controlled deformations of the mirror.

The reflectivity of the mirror is enhanced by placing multilayer dielectric coating between the optical flat and the liquid. Such dielectric enhancement coatings are so thin that heating effects are not created by the insertion of such layers. They can increase the normal 86% reflectivity of mercury to over 99%.

DESCRIPTION OF THE PREFERRED EMBODIMENT

Figure 1:
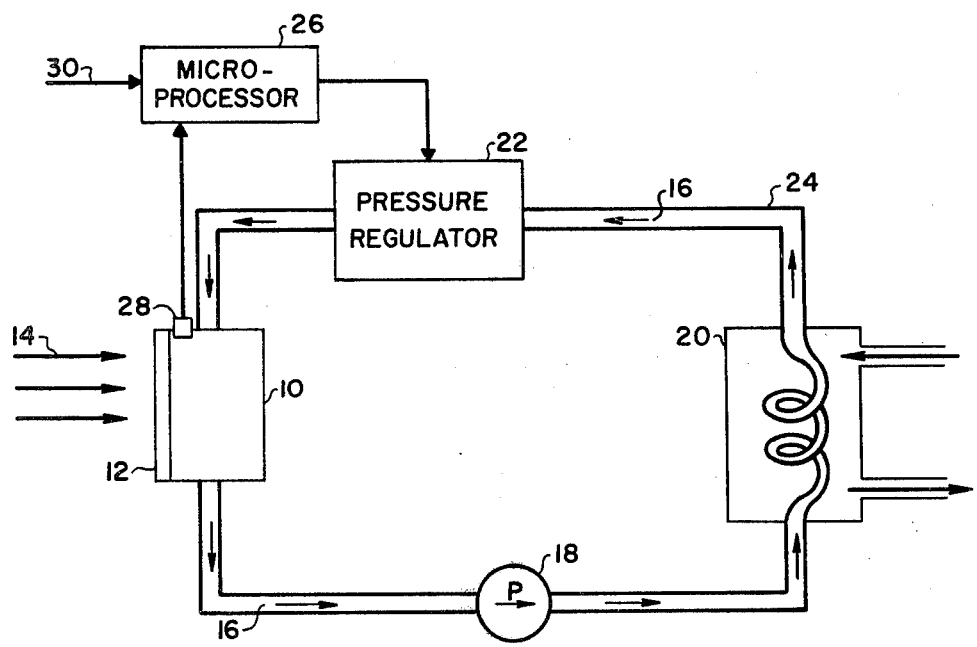
FIG. 1 shows the preferred embodiment.

FIG. 1 shows the basic system of the present invention. A pressure cell 10 has an optical flat window 12 which is transparent to laser light 14. Pressure cell 10 serves as a reservoir for a working liquid which reflects light 14. The working liquid circulates as shown by arrows 16 and is driven by a pump 18. The liquid and optical flat 12 are heated by light 14. The heat is carried away by the working liquid and removed by a heat exchanger 20. Residual thermal distortion not removed by heat exchanger 20 is corrected by controlling the pressure of liquid in cell 10 by means of a pressure regulator 22.

The working liquid is either mercury, gallium, a mixture of gallium and aluminum or a mixture of mercury and gallium. These metals have low melting points and are liquid metal at low temperatures. For purposes of example, mercury will be used as the working liquid throughout the remaining description because it has the best reflectivity for the visible range and is a liquid at the lowest temperature. To pump the mercury, a metal tubing 24 is used to support the weight of the mercury. Since mercury is highly corrosive to most metals, a teflon or similar lining is used which remains inert with the flow of mercury. Similarly, pump 18, regulator 22 and cell 10 must be lined to protect against corrosion.

Microprocessor 26 receives input from a thermal sensor 28 such as a thermocouple. Sensor 28 could be a plurality of thermocouples which monitor both the temperature of the mercury and the temperature of optical flat 12. Microprocessor 26 controls pressure regulator 22. Residual heat in the mercury that heat exchanger 20 cannot extract and heating effects of absorbed heat in optical flat 12 are compensated by adjusting the pressure in cell 10 by pressure regulator 22. Microprocessor 26 also receives external signals 30 which measure predetermined conditions outside the mirror. Examples of such conditions include laser wave front distortion occuring anywhere else in the laser system whether in the laser medium or the output mirror. The present invention can also be used outside the laser cavity as a focusing or directing mirror for redirecting the output beam.

The optical distortion figure of merit is equal to $$\rho C\rho/\alpha$$

where:
 $\rho$ = density
 $C\rho$ = heat capacity at constant volume

α=coefficient of linear thermal expansion

For the mercury which is free to expand, α looses meaning and can be considered to approach 0. This results in the optical distortion figure of merit approaching infinity. Heat exchanger 20 effectively removes heat from the mercury so that the mercury never builds up pressure causing an expansion problem. However, optical flat 12 is cooled indirectly by heat exchanger 20. Thus, optical flat 12 is subject to uneven heating and α for the glass is not changed. Distortions in the glass are adjusted by correcting the pressure in the mercury.

Optical flat 12 should be highly polished to minimize scatter. The mercury will conform perfectly to the glass surface of optical flat 12. As a result, any pit or scratch in the glass will be filled with mercury. However, this is an advantage in the system. Metallic mirrors are not polished as readily as glass. By using mercury against the polished glass, the reflecting surface of the mirror is of the same surface quality as the glass. A highly reflecting metallic mirror with the surface quality of highly polished glass is thus provided for.

Figure 2:
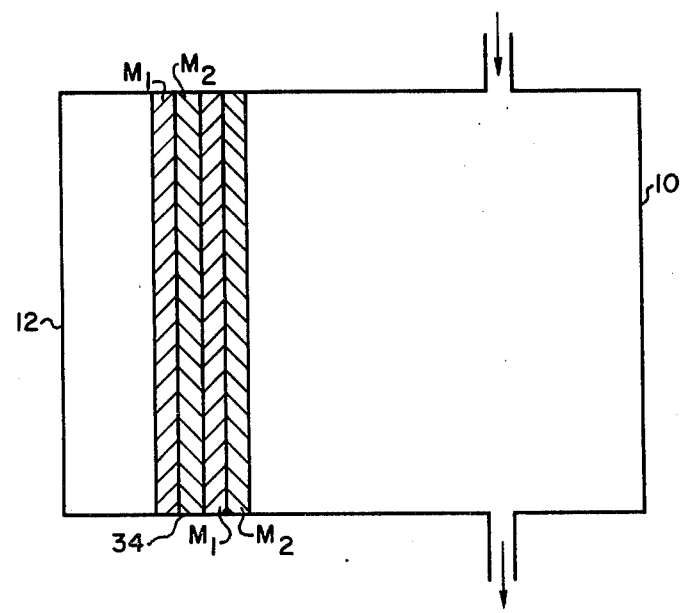
FIG. 2 shows a further refinement of the preferred embodiment.

FIG. 2 shows a further refinement of the present invention. A multilayer dielectric coating 34 is inserted between optical flat 12 and mercury in cell 10. FIG. 2 is not drawn to scale. The dielectric material is in layers of quarter wavelength thickness. The number of layers and materials used are the same as those well known in the art of dielectric enhanced metal reflectors. The layers alternate between materials of high refractive index and of low refractive index. Examples of materials used are ZnS for the high index material and ThF$_4$, ThOF$_2$, NaAlF$_6$ or MgF$_2$ have been used for the low index material. The papers by D. L. Perry and J. Berthold cited in the Description of Prior Art section give examples of how such layers can be deposited. The difference here is that the material is applied to the optical flat and the liquid metal is allowed to flow along dielectric 34. The total thickness of dielectric 34 is so thin that no heating problems within the dielectric have been observed.

Dielectric 34 is shown in alternating layers of index of refraction $n_1$ and $n_2$. The number of layers will vary depending on the specific material used and level of reflectivity for a specific wavelength range as described in the cited references.

Figure 3:
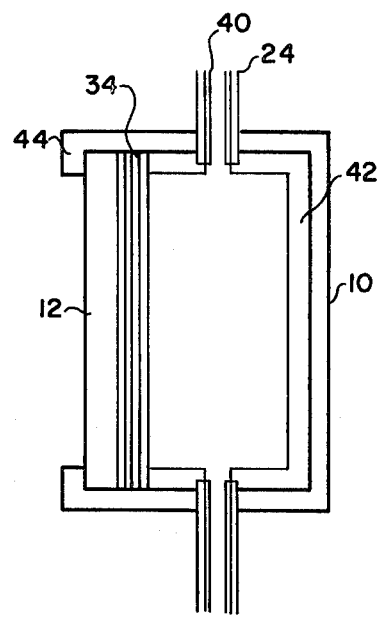
FIG. 3 is a view of a pressure cell.

FIG. 3 is a detailed cross-section of a pressure cell. Tubing 24 is shown with a lining 40 which is made of teflon or some other material that is inert when mercury flows through it. Similarly cell 10 is lined with a coating 42 of teflon. Optical flat 12 is retained in cell 10 by a notch 44. Mercury is kept from touching optical flat 12 by multilayered dielectric 34. The last layer of the dielectric stack must be inert with mercury since it is in direct contact with mercury in pressure cell 10.

Figure 4A:
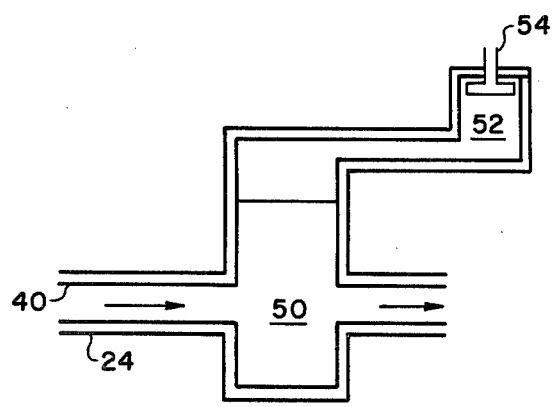
FIGS. 4a and 4b show possible pressure regulators.
Figure 4B:
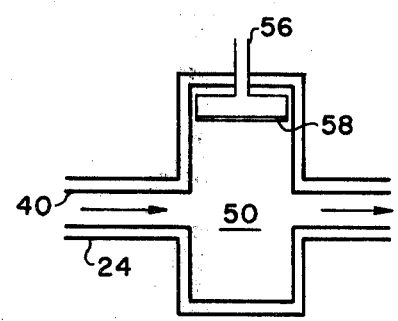

FIGS. 4a and 4b show possible methods of designing pressure regulator 22. In FIG. 4a, mercury flows through tubing 24 with lining 40 into a reservoir 50. Above the mercury, in reservoir 50 is an air column 42 which is regulated by a piston 54. The air column keeps mercury from reacting with piston 54. When piston 54 compresses air column 52, the pressure of the mercury in the system increases. Optical flat 12 in FIG. 3 will bulge out, thus producing a convex mirror. When the pressure is lowered, by moving piston 54 up, the pressure of the mercury drops and optical flat 12 is pushed inward by external air pressure.

FIG. 4b uses a piston 56 with a teflon coating 58 to press directly on the mercury. Mercury seepage around the piston is now a problem, but the pressure on the mercury is now subject to direct control. Both pistons 54 and 56 are regulated by microprocessor 26 through control means not shown.

The shape of optical flat 12 can be pressure regulated to be either concave or convex. Positive pressure in cell 10 will produce a convex mirror. If optical flat 12 is polished flat while under pressure, a reduction in pressure will result in a concave surface.

The use of nonflat optical surfaces can enhance the focusing of such a mirror. It has been shown that wavefront distortion produced in the laser director or atmosphere can be significantly reduced by compensation in the laser mirrors. The use of such optical plates provides the same advantage of a metal mirror whose smoothness is controlled by the polish of the optical plate.

What is claimed is:

1. A liquid laser mirror for reflection of light comprising:
   a working liquid that reflects said laser light;
   a pressure cell with an inlet and an outlet for containing said working liquid as it flows through said cell under predetermined pressure;
   an optical plate transparent to said laser light which is within said pressure cell and oriented to face incoming laser light where said optical plate has been polished to eliminate scatter of light from the surfaces of said optical plate;
   a pressure regulator connected to said pressure cell for controlling said predetermined pressure of liquid in said pressure cell by the input flow to said pressure cell;
   a pump connected to the outlet of said pressure cell for circulating said working liquid; and
   a heat exchanger connected between said pump and said pressure regulator for cooling said working liquid.

2. A liquid laser mirror as described in claim 1 further comprising:
   a temperature sensor within said pressure cell connected between said pressure cell and said pressure regulator for monitoring the temperature of said working liquid in said pressure cell; and
   a microprocessor connected between said sensor and said pressure regulator for adjusting the pressure of working liquid to said pressure cell so as to deform the optical plate in said pressure cell according to the temperature of said working liquid in said pressure cell.

3. A liquid laser mirror as described in claim 2 further comprising an external correction input to said microprocessor for varying the pressure of said working liquid in said pressure cell dependent on predetermined external conditions.

4. A liquid laser mirror as described in either claim 1 claim 2 or claim 3 wherein the working liquid is chosen from the group consisting of mercury, gallium, gallium alloyed with aluminum and gallium alloyed with mercury.

5. A liquid laser mirror as described in either claim 1 claim 2 or claim 3 wherein said optical plate is an optical flat highly polished.

6. A liquid laser mirror for reflection of light comprising:
   a working fluid chosen from the group consisting of mercury, gallium, gallium alloyed with aluminum and gallium alloyed with mercury;

a pressure cell with an inlet and outlet for containing said working liquid as it flows through said pressure cell under predetermined pressure;

an optical flat plate of glass transparent to said laser light which is placed within said pressure cell and oriented to face incoming laser light where said optical flat has been highly polished to eliminate scatter of light from the surfaces of said optical flat;

a pressure regulator connected to said pressure cell for controlling said predetermined pressure of liquid in said pressure cell by the input flow to said pressure cell;

a pump connected to the outlet of said pressure cell for circulating said working liquid;

a heat exchanger connected between said pump and said pressure regulator for cooling said working liquid;

a temperature sensor within said pressure cell connected between said pressure cell and said pressure regulator for monitoring the temperature of said working liquid in said pressure cell;

a microprocessor connected between said sensor and said pressure regulator for adjusting the pressure of working liquid to said pressure cell so as to deform the optical flat in said pressure cell according to the temperature of said working liquid in said pressure cell; and an external correction input to said pressure regulator for adjusting the pressure of said working liquid in said pressure cell dependent on predetermined external conditions.

7. A liquid laser mirror as described in either claim 1, claim 2, claim 3 or claim 6 further comprising a multi-layer dielectric coating between said optical flat and said working liquid for enhancing reflection.

8. A liquid laser mirror as described in either claim 2, claim 3 or claim 6 wherein said temperature sensor is a thermo couple.

9. A liquid laser mirror as described in either claim 1 claim 2, claim 3 or claim 6 wherein the heat exchanger is a conduit carrying said working liquid through a bath of cooling fluid.

* * * * *